(No Model.)
E. M. BENTLEY.
CONTACT DEVICE FOR ELECTRIC RAILWAYS.
No. 427,726. Patented May 13, 1890.
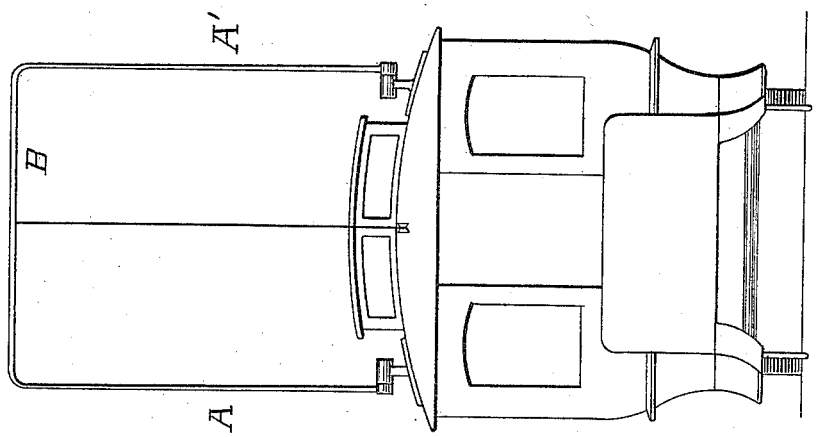
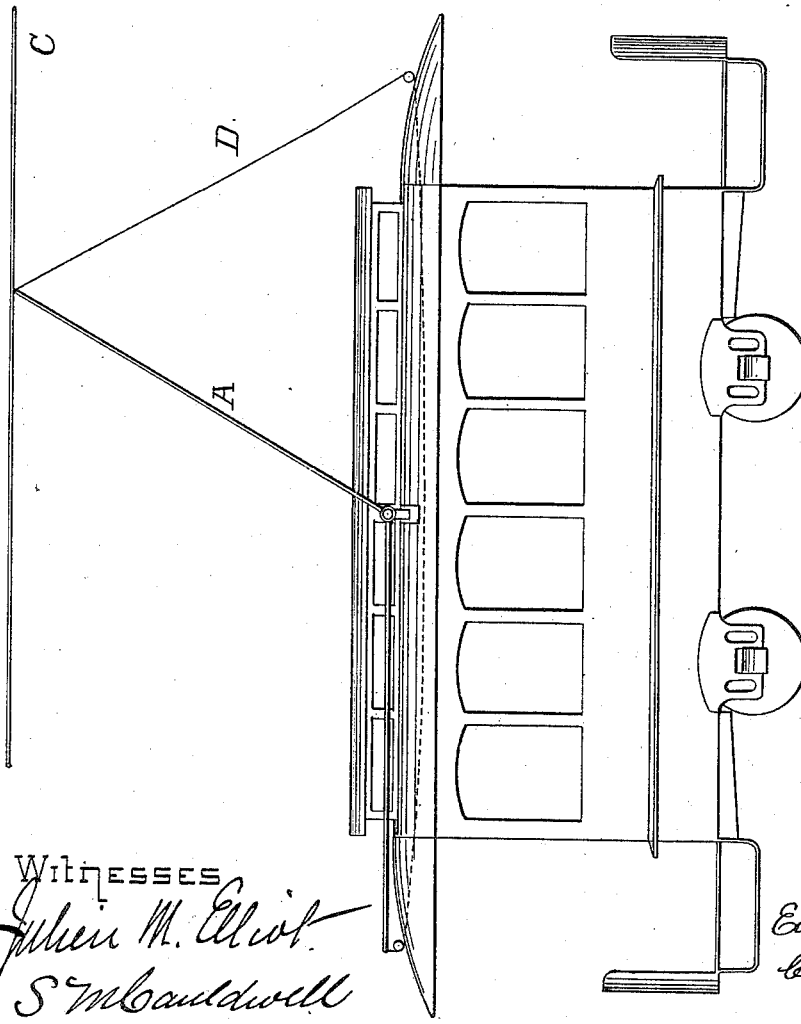
Witnesses
Julien M. Elliot
S. M. Cauldwell
Inventor
Edward M. Bentley
by Bentley & Knight
Attys

UNITED STATES PATENT OFFICE.

EDWARD M. BENTLEY, OF NEW YORK, N. Y.

CONTACT DEVICE FOR ELECTRIC RAILWAYS.

SPECIFICATION forming part of Letters Patent No. 427,726, dated May 13, 1890.

Application filed June 5, 1889. Serial No. 313,177. (No model.)

*To all whom it may concern:*

Be it known that I, EDWARD M. BENTLEY, a citizen of the United States, residing at New York, in the county of New York, State of New York, have invented certain new and useful Improvements in Contact Devices for Electric Railways, of which the following is a specification.

My invention relates to contact devices for electric railways, in which the line-conductor is suspended above the car; and it comprises, in combination with other features, an upright piece pivoted to the top of the vehicle and provided at its upper end with a transverse contact-piece of a length sufficient to make connection with the wire at any point along the range of transverse movement of the vehicle relatively to the wire.

My invention is illustrated in the accompanying drawings, in which—

Figures I and II are respectively side and end elevations of a vehicle equipped with my improved contact device.

In the figures, A A' represent upright rods, preferably of resilient material, pivoted at their lower ends to the roof of the vehicle and connected at their upper ends by a transverse bar B, which is adapted to travel along in contact with the suspended line-wire C. A corresponding pair of rods E are fastened to A A' at their base, so as to be substantially rigid therewith and partake of their movement. These two sets of rods extend in opposite directions from their common pivotal point, maintaining substantially the angular relation to each other shown in the drawings, so that when one pair is up in position for making contact for one direction of progress of the car the other set will be lying down along the roof of the car or vehicle. A cord D is connected to one contact-bar B and passes from thence to the end of the car, and after passing along through the car is connected with the corresponding bar on the other contact device. By this means whenever the car is to proceed in either direction the corresponding bar B is brought up against the wire C and the other one is pulled down with the same movement along the roof of the car and held by fastenings to cord D in any desirable way. By the resiliency of the system formed by the two contact devices a yielding contact with conductor C is maintained as the car proceeds. When the direction of progress is reversed, the contact device will be correspondingly reversed. It will be noticed that the bar B is bent over at its ends where it comes in connection with the rods A A'. By this means there is no interference with the branching wires at the switch-point, as the rounded corner allows a branching wire to slide easily over onto bar B.

I do not intend to limit myself to two upright rods A A', as one may be employed, if desired.

By my invention no joints of any kind are necessary for the operation of the contact on curves and irregularities in the line-wires, and no careful direction of the contact device, when it is raised into position against the wire, is necessary.

In the device illustrated the two contact devices are shown as connected rigidly at a definite angle with each other. The rigidity in the connection, however, is not essential, as a connection with more or less play, but giving ultimately a firm hold of one device upon the other, would serve the same purpose.

What I claim as new, and desire to secure by Letters Patent, is—

1. The combination, with a moving vehicle and a line-conductor, of two contact devices adapted to be brought alternately into engagement with the line-conductor according to the direction of travel of the vehicle and connected together, so that the one is moved into operative position upon the movement of the other away therefrom.

2. The combination, with a moving vehicle and a suspended line-conductor, of two contact devices extending in opposite directions from a common pivotal point, and adapted to be brought alternately into engagement with the line-conductor according to the direction of travel of the vehicle.

3. The combination, with a moving vehicle and a suspended line-conductor, of duplicate contact devices connected together at an angle and pivoted to the vehicle, whereby they may be alternately placed in operative connection with the line-conductor.

4. The combination, with a moving vehicle and a suspended line-conductor, of two rods connected together at an angle and pivoted to the vehicle, and a transverse contact device on the upper ends of the two rods respectively.

5. The combination, with a moving vehicle and a suspended line-conductor, of a contact device consisting of the outwardly-extending rods, held together and pivoted to the roof of the vehicle, and having contact devices at their outer ends, respectively, and an operating-cord extending from the outer extremities of each to the vehicle.

6. The combination, with the upwardly-extending rods A and E, held together at their base and pivoted to the vehicle, of an intermediate flexible cord D, connected to the outer ends of each and having its intermediate portion passed along the vehicle.

7. The combination, with a moving vehicle and a suspended line-conductor, of an upwardly-extending flexible rod carrying the contact device at its outer end, and a second flexible rod extending therefrom at an angle and connected at its outer extremity to the vehicle.

8. The combination, with an electrically-propelled vehicle and a suspended line-conductor, of a contact device extending laterally across the vehicle, having rounded or beveled ends, and adapted to bear on the under side of the line-conductor.

9. The combination, with the upwardly-extending rods A A', pivoted to the vehicle, of a transverse contact-piece B, adapted to bear on the under side of the line-conductor.

EDWARD M. BENTLEY.

Witnesses:
F. O. BLACKWELL,
J. L. BLACKWELL.